United States Patent
Shearer et al.

[11] 3,887,875
[45] June 3, 1975

[54] DIGITAL SIGNAL LEVELING DEVICE

[75] Inventors: Harry D. Shearer, St. Petersburg; Eli J. Dalabakis, Seminole, both of Fla.

[73] Assignee: NCR Corporation, Dayton, Ohio

[22] Filed: Sept. 7, 1973

[21] Appl. No.: 395,022

[52] U.S. Cl. ............... 328/168; 307/264; 328/53; 328/173; 330/127
[51] Int. Cl. .................... H03b 3/02; H03k 5/02
[58] Field of Search .......... 330/28, 86, 127; 328/53, 328/168, 173, 175; 307/264, 268

[56] References Cited
UNITED STATES PATENTS

| | | | |
|---|---|---|---|
| 3,130,400 | 4/1964 | Washburn | 328/168 X |
| 3,458,821 | 7/1969 | Clarridge | 330/86 |
| 3,510,682 | 5/1970 | Nichols | 330/29 X |
| 3,579,138 | 5/1971 | Harris et al. | 330/86 |

Primary Examiner—John Zazworsky
Attorney, Agent, or Firm—J. T. Cavender; Lawrence P. Benjamin

[57] ABSTRACT

In order to level the amplitude of pulses received from diverse sources at a predetermined repetition rate, as in a loran system, a digital representation of the amplitude of each received pulse is developed, delayed, and used to appropriately set up a scaler which affects the amplitude of the next succeeding pulse from the same source.

7 Claims, 1 Drawing Figure

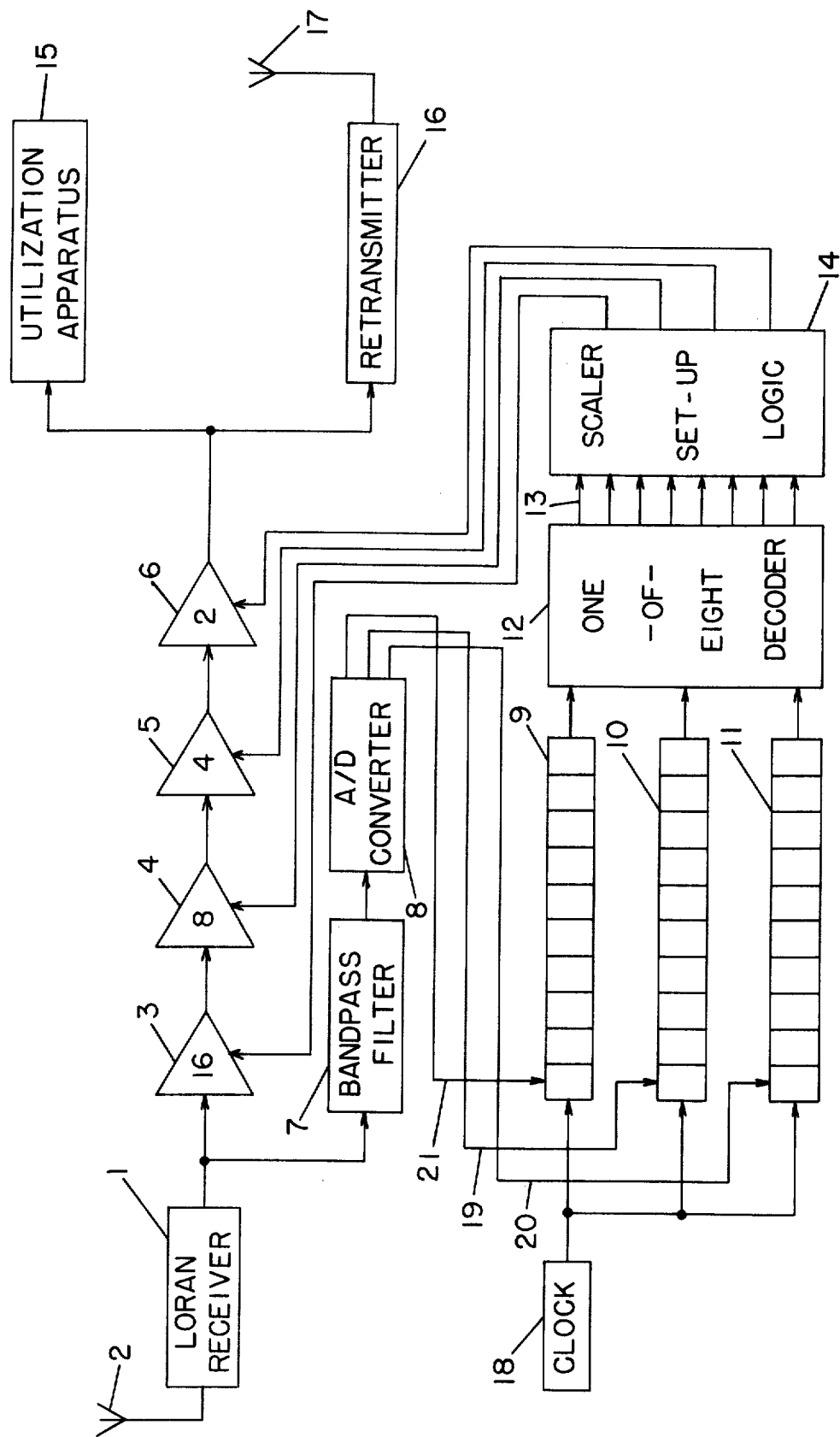

DIGITAL SIGNAL LEVELING DEVICE

This invention was made in the course of work carried out under U.S. Government Contract No. F33657-71-C-0121-002.

BACKGROUND OF THE INVENTION

Accurate navigational fixes may be obtained by utilizing one of the long range navigation systems generally known in the art as loran. The principle of loran is based on measurement and analysis of the difference in elapsed time required for pulsed radio signals to arrive at a point from a pair of synchronized transmitters. The transmitters are disposed at known positions and situated a known distance, typically several hundred miles, apart. One of the transmitters, designated the master, issues pulses at a predetermined repetition rate. A second transmitter, designated the slave, issues corresponding pulses on the same carrier frequency in response to master pulses received at the slave station. The instant at which a master pulse is received by the slave station is, of course, delayed from the instant of transmission by the propagation time between the stations. Some additional constant delay is electronically introduced at the slave station before a responsive pulse is issued by the slave transmitter. This additional delay is utilized to resolve a certain ambiguity which will be noted below.

Receiving apparatus at the unknown position intercepts pulses from both the master and slave stations. By observing the elapsed time between the reception of a master pulse and the reception of the corresponding slave pulse, the receiving station may be identified as positioned at one of the locus of points which define a specific spherical hyperbola from the family of spherical hyperbolae having the master and the slave station sites as foci. The introduction of supplementary delay prior to retransmission of the received master pulse by the slave transmitter permits differentiating the proper hyperbola from its mirror image. Additionally, the supplementary delay is chosen such that the master pulse of a master/slave pair is always first to be received which simplifies the time differential measurement task at the receiving point.

Another reading from a second master/slave station pair will establish the unknown position as also being at one of the locus of points which defines a second specific spherical hyperbola from the family of spherical hyperbolae having the second master and slave stations as foci.

The two spherical hyperbolae are ordinarily treated as cylinderical hyperbolae for charting such that the intersection between the two defines the two dimensional position of the receiving station. To further simplify the system, a single master station may have more than one slave station in order that the two measurements may be taken between the master and a first slave and the master and a second slave.

Those skilled in the art will appreciate that the accuracy to which a loran fix is carried out is dependent upon the precision to which the time lapse between a received master pulse and a later received slave pulse may be measured. In one mode of measurement well known in the art, an operator brings the pulses into successively closer alignment by appropriately manipulating controls which move the slave pulse on a display and, on a stepwise basis, increases the sweep speed of the display. A final step is visual superimposition of the leading edges of the master and slave pulses at the highest display sweep speed. When the operator is satisfied with the alignment of the leading edges, a reading indicative of the reception time lapse is taken from the setting of various controls.

More recently, the measurement step has been carried out automatically by sophisticated apparatus, varient forms of which are well known in the art. The adoption of automatic time difference measurement techniques has, however, focused attention on a variable factor which can adversly affect the accuracy of the measurements if not closely compensated. Since the master and slave pulses are received from diverse sources, the length of transmission and the propagation conditions along the two paths to the receiving point usually result in the reception of different strength signals. The shape of the pulses as transmitted is identical to permit closer superimposition at the receiving point. Thus, pulse amplitude of the master and slave pulses must be watched at the receiving point in order that amplitude distortion does not give a false indication of leading edge coincidence or occurence. That is, the shapes of the pulses at the measurement apparatus should be as nearly the same as may be achieved.

Further, in more refined systems, such as Loran C and Loran D, important information is carried in the phase of a pulse. As a result, severe restrictions against introduction of any sort of distortion are placed on signal leveling circuitry which might be incorporated into the system.

In the older apparatus, pulse amplitude control at the receiving point could readily be effected by simple observation and appropriate adjustment of an amplitude balancing circuit by the operator. However, the problem becomes much more severe in loran systems employing automatic time difference measurement techniques. Straightforward automatic gain control techniques cannot be applied since the receiver is tuned to two transmitting stations. The strength of the received signals differ randomly such that a compromise a.g.c. signal cannot be used to separately control the amplitude of each pulse.

As a result, the prior art has been characterized by the utilization of very complex automatic gain control systems employed in loran receivers in which the time measurement function is carried out automatically. Beyond complexity, in those prior art systems in which a given pulse causes automatic gain control to be developed for itself, consequent pulse waveform distortion adversely affects the accuracy to which the time difference measurements can be made. And, as noted above, pulse distortion is intolerable in systems in which pulse phase is meaningful.

The necessity to level loran pulses received from diverse sources is particularly important in systems in which retransmission of the position information is carried out. Such retransmission techniques are utilized, for example, in locating downed aircraft. Loran pulses received at the aircraft are extracted and retransmitted verbatim to a search mission which can utilize the information to determine the position of the downed aircraft. However, in the signal processing necessary for effecting retransmission, a low level pulse can become lost in noise if it is substantially lower in amplitude than a strong pulse to which the receiving apparatus must also accommodate itself.

Therefore, those skilled in the art will appreciate that it would be highly desirable to provide relatively simple and reliable means by which master and slave pulses could be completely independently amplitude controlled.

It is therefore a broad object of this invention to provide improved a.g.c. means in a communications system.

It is a more specific object of this invention to provide such improved a.g.c. means in a receiver adapted for the reception of pulses which occur at a predetermined repetition rate.

In a still more specific aspect, it is an object of this invention to provide such improved a.g.c. means in which pulses are received at the predetermined repetition rate on a single channel from a plurality of diversely situated transmitters, pulses from each source being independently controlled to effect signal leveling.

In another aspect, it is further object of this invention to condition received loran pulses prior to retransmission to increase the reliability of information retrieval at the receiving end of the retransmission link.

Briefly, these and other objects are achieved, according to a presently preferred embodiment of the invention, by developing a multiple bit digital representation of the amplitude of each incoming pulse, introducing each bit of the representation into an individual delay unit, extracting the delayed amplitude information, and accordingly setting up a scaler in the direct signal path in time to affect the amplitude of the next succeeding like pulse.

The subject matter of the invention is particularly pointed out and distinctly claimed in the concluding portion of specification. The invention however, both as to organization and method of operation, may best be understood by reference to the following description taken in connection with the accompanying drawing of which:

The single FIGURE is a block diagram of a presently preferred embodiment.

DETAILED DESCRIPTION OF A PREFERRED EMBODIMENT:

Referring now to the single FIGURE, it will be observed that a loran receiver 1 is coupled to a receiving antenna 2 for the reception and demodulation of loran pulses from diverse transmitting sites. The pulses pass through a scaler comprising attenuators 3, 4, 5 and 6 which selectively attenuate a signal passing therethrough by factors of 16, 8, 4 and 2, respectively. Each of the attenuators 3, 4, 5 and 6 may be independently activated to perform the attenuating function or deactivated to provide a straightthrough path for a signal applied thereto. Therefore, it will be understood that attenuation ratios of 2, 4, 8, 16, 32, 64, 128, or 256 may be selected to provide respective attenuation factors of 6, 12, 18, 24, 30, 36, 42, and 48 db. By appropriately setting up the scaler combination prior to the passage of a given pulse, all pulses may be leveled to within ±6 db.

Each pulse is also applied to the input of a bandpass filter 7, and the electrical point common to the inputs of the bandpass filter 7 and the attenuator 3 may be deemed the input terminal to the automatic gain control apparatus. The bandpass filter 7 is utilized to strip away noise outside the passband of interest before the pulse is applied to an analog-to-digital converter 8. The analog-to-digital converter samples the pulse to develop a three bit representation of its amplitude range and issue the three bits in parallel from separate outputs to lines 19, 20, and 21.

Each bit of the three bit digital amplitude representation is then introduced into a corresponding delay line 9, 10, and 11, respectively. The delay length of the delay lines 9, 10, and 11 is predetermined such that the cumulative delay of the a.g.c. control branch equals the frame time of the pulses being conditioned. Typically, any of a number of decoders 12 may be used to achieve the desired results. We have found, for example, that the Fairchild TTL/MSI 9311 1-of-16 decoder may be employed, using only those inputs and outputs needed. Similarly, only those necessary portions of a Fairchild TTL/MSI 9315, 1-of-10 decoder may be used with success. After the three bit representation of the pulse amplitude issues from the delay lines 9, 10, and 11, it is impressed on the inputs of one-of-eight decoder 12. The decoder senses which specific bit pattern (000–111, inclusive, to represent 6–48 db attenuation steps respectively) is present and issues a single signal on a correspondingly selected one of the output lines 13 which controls scaler setup logic 14. The one-of-eight decoder 12 may comprise a straightforward gate array minimized by Boolean techniques or the functional equivalent.

The scaler setup logic 14, in response to a signal received on the selected one of output lines 13, energizes the attenuators, 3, 4, 5, and 6 in accordance with the amplitude range of the sample pulse. Because of the delay, however, the pulse affected by the scaler setup is the next succeeding one from the same source such that the attenuation of a given pulse is dependent upon the amplitude of the preceding pulse received by the loran receiver 1 from the same source. The scaler setup logic 14 may comrpise a conventional encoding logic array minimized by Boolean techniques or the functional equivalent. By way of Example, any eight-input-four-output, decimal-to-binary output converter may be used for scaler setup logic 14. This may typically be a cascaded pair of Signetics 82S33 devices.

In operation, by way of example, consider two successive frames during each of which a single master pulse and a single slave pulse are received. Assume that the master pulses are rather weak such as 6 db above a reference level desired at the output of the last attenuator 6 of the scaler. This electrical point may be deemed the output terminal of the a.g.c. apparatus. Assume further that the slave pulses are much stronger, 42 db above the reference level. When the first master pulse enters the a.g.c. apparatus, the analog-to-digital converter 8 measures its amplitude and issues a 000 digital representation of the amplitude. The three bits are simultaneously introduced into the delay lines 9, 10, 11, and commence to propagate therethrough. Subsequently, when the first slave pulse enters the a.g.c. apparatus, the analog-to-digital converter issues a 110 digital representation which also is introduced into the delay lines.

Just prior to entry of the second master pulse into the apparatus, the 000 digital representation issues from the delay lines 9, 10, 11, and the one-of-eight decoder 12 and the scaler setup logic 14 respond by activating the attenuator 6 which effects a 6 db attenuation to the second master pulse. Similarly, just prior to entry of the second slave pulse into the apparatus, the 110 digital representation issues from the delay lines to cause the attenuators 3 and 4 to be activated, thereby setting up a 42 db attenuation path.

Thus, the pulses in the second frame have been leveled to within 6 db, and the pulses of a third frame will be conditioned in accordance with the amplitude of the second frame pulses, the process continuing on a frame-to-frame basis to always provide the desired leveling.

After passing through the a.g.c. apparatus, the pulses are applied to local utilization apparatus 15 for analysis to determine the local position in accordance with conventional loran techniques. Alternatively, the leveled pulses may also be applied to a retransmitter 16 for transmission via an antenna 17 on a radio link for remote reception and analysis.

Inasmuch as loran pulses are received at a closely controlled predetermined repetition rate the delay lines 9, 10, and 11 preferably take the form of shift registers shifted at appropriate rates by a clock 18. By way of example, the shift of bits from stage to stage through the shift registers is controlled by a digital clock frequency $L \times R$ where $L$ is the length (number of stages) of the shift register and $R$ is the frame rate. Thus, for the case of a typical loran signal in which the frame rate $R=10$ frames/second and a 100 bit shift register, the clock frequency is equal to: $F_c = L \times R = 100 \times 10 = 1,000$ pulses/second. For stability, the clock 18 is preferably a crystal controlled oscillator, frequency divided. Different repetition rates may then be selected by changing the division ratio or selecting a different crystal.

At any given instant of time, the amplitude representations for all pulses within a complete frame are propagating through the shift registers. Consequently, the apparatus can accommodate any number of non-overlapping pulses per frame. Hence, the effect of non-overlapping strong interferring pulses can be minimized while weaker desired signal pulses can be relatively enhanced. The equalization range, of course, can be increased by utilizing a greater number of bits in the analog-to-digital conversion process and an attendant increase in the number of attenuators used. Similarly, the resolution of the equalization may be increased as the number of bits in the analog-to-digital conversion process are increased. Additionally, amplifiers of fixed, predetermined gain can be substituted for one or more of the attenuators to raise the reference to which the pulses are normalized.

While the principles of the invention have now been made clear in an illustrative embodiment, there will be immediately obvious to those skilled in the art many modifications of structure, arrangement, and components used in the practice of the invention which are particularly adapted for specific environments and operating requirements without departing from those principles.

What is claimed is:

1. Automatic gain control apparatus for leveling the amplitude of pulses received at a predetermined repetition rate, said automatic gain control apparatus having an input terminal and an output terminal, said automatic gain control apparatus comprising:
   A. an analog-to-digital converter coupled to said input terminal for converting the amplitude of pulses appearing thereat into a plural bit digital representation, each of said bits issuing from separate outputs from said analog-to-digital converter;
   B. a plurality of pulse delay means corresponding in number to the number of bits in said plural bit representation;
   C. means coupling each output from said analog-to-digital converter to the input of a separate one of said plurality of pulse delay means;
   D. scaler means connected between the input and output terminals of said automatic gain control apparatus for selectively attenuating a pulse passing therethrough in accordance with level control signals applied to said scaler; and
   E. means for receiving the digital representation from said delay means and developing level control signals in accordance with the bit configuration of the plurality of pulse delay means for application to said scaler.

2. Automatic gain control apparatus for leveling the amplitude of pulses received at a predetermined repetition rate, said automatic gain control apparatus having an input terminal and an output terminal, said automatic gain control apparatus comprising:
   A. an analog-to-digital converter coupled to said input terminal for converting the amplitude of pulses appearing thereat into a plural bit digital representation, each of said bits issuing from separate outputs from said analog-to-digital converter;
   B. a plurality of pulse delay means corresponding in number to the number of bits in said plural bit representation;
   C. means coupling each output from said analog-to-digital converter to the input of a separate one of said plurality of pulse delay means;
   D. a decoder responsive to a plurality of digital inputs for issuing an output signal on a selected one of a plurality of output lines therefrom, said selected output line being determined in accordance with the bit configuration of said plurality of digital inputs, said plurality of digital inputs corresponding in number to the number of bits in said plural bit representation, each of said plurality of said output lines corresponding to a unique combination of said plural bit representation;
   E. means coupling separate outputs from each of said pulse delay means to corresponding separate inputs to said decoder;
   F. a scaler connected between the input and output terminals of said automatic gain control apparatus for selectively attenuating a pulse passing therethrough in accordance with level control signals applied to said scaler; and
   G. scaler set up logic coupled to said plurality of outputs from said decoder and responsive to the presence of a signal on a single one thereof to develop level control signals for application to said scaler.

3. The automatic gain control apparatus of claim 2 in which each of said pulse delay means comprises a shift register.

4. The automatic gain control apparatus of claim 3 which further includes a clock for shifting said shift registers at a predetermined rate in accordance with the time span between the reception of succeeding pulses from a common source.

5. The automatic gain control of claim 4 in which said scaler comprises a plurality of serially disposed attenuators, each providing a different attenuation ratio.

6. The automatic gain control apparatus of claim 5 in which the attenuation ratios of said attenuators are related to one another in powers of 2.

7. A method for leveling the amplitude of pulses received at a predetermined repetitious rate comprising the steps of:
   A. effecting an analog-to-digital conversion of a pulse to provide a digital representation of the amplitude thereof;
   B. delaying the digital representation for a predetermined period equal to the time span between the reception of succeeding pulses from a common source; and
   C. utilizing the delayed digital representation to control the gain of a signal path through which a succeeding pulse, from a source common to that pulse from which the digital representation was developed, passes.

* * * * *